United States Patent
Giri et al.

(10) Patent No.: US 11,669,619 B2
(45) Date of Patent: Jun. 6, 2023

(54) SYSTEM AND METHOD OF UTILIZING MULTIPLE INFORMATION HANDLING SYSTEM FIRMWARE ON AN INFORMATION HANDLING SYSTEM

(71) Applicant: Dell Products L.P., Round Rock, TX (US)

(72) Inventors: Prashanth Giri, Round Rock, TX (US); Wei G. Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/443,697

(22) Filed: Jul. 27, 2021

(65) Prior Publication Data

US 2023/0032359 A1 Feb. 2, 2023

(51) Int. Cl.
*G06F 21/57* (2013.01)
*G06F 9/4401* (2018.01)
(Continued)

(52) U.S. Cl.
CPC .......... *G06F 21/572* (2013.01); *G06F 9/4401* (2013.01); *G06F 13/4282* (2013.01); *H04L 9/3239* (2013.01); *H04L 9/3247* (2013.01); *G06F 2213/0042* (2013.01); *G06F 2221/033* (2013.01)

(58) Field of Classification Search
CPC .. G06F 21/572; G06F 9/4401; G06F 13/4282; G06F 2213/0042; G06F 2213/033; H04L 9/3239; H04L 9/3247
See application file for complete search history.

(56) References Cited

U.S. PATENT DOCUMENTS

2014/0325496 A1* 10/2014 Son ............................ G06F 8/65
717/168
2015/0324588 A1* 11/2015 Locke ................... G06F 21/562
713/2

(Continued)

OTHER PUBLICATIONS

Hendricks, David; "FOSS Project Spotlight: LinuxBoot"; Feb. 15, 2018; Linux Journal; accessed on the internet at URL<https://www.linuxjournal.com/content/foss-project-spotlight-linuxboot>. (Year: 2018).*

(Continued)

*Primary Examiner* — Glenn A. Auve
(74) *Attorney, Agent, or Firm* — McDermott Will & Emery LLP

(57) ABSTRACT

In one or more embodiments, one or more systems, one or more methods, and/or one or more processes may read configuration information that indicates utilization of a custom information handling system firmware IHSFW image by an information handling system (IHS); provide the custom IHSFW image and a signature of the custom IHSFW image to a processor of the IHS; decrypt the signature of the custom IHSFW image to obtain a hash value of the custom IHSFW image; determine a test hash value of the custom IHSFW image; determine if the hash value matches the test hash value; if the hash value matches the test hash value, boot a custom IHSFW from the custom IHSFW image; and if the hash value does not match the test hash value, boot another IHSFW from another IHSFW image stored by a non-volatile memory medium of the IHS.

14 Claims, 4 Drawing Sheets

(51) Int. Cl.
  *H04L 9/32* (2006.01)
  *G06F 13/42* (2006.01)

(56) References Cited

U.S. PATENT DOCUMENTS

| | | | |
|---|---|---|---|
| 2016/0170736 A1* | 6/2016 | Landry | G06F 11/1433 |
| | | | 717/168 |
| 2017/0041200 A1* | 2/2017 | Christopher | G06F 3/06 |
| 2017/0085383 A1* | 3/2017 | Rao | G06F 21/575 |
| 2017/0098084 A1* | 4/2017 | Kulkarni | G06F 9/4401 |
| 2018/0276387 A1* | 9/2018 | Liu | G06F 21/575 |
| 2020/0134185 A1* | 4/2020 | Cho | G06F 21/602 |
| 2020/0293661 A1* | 9/2020 | Liu | H04L 9/0894 |
| 2021/0334378 A1* | 10/2021 | Kennedy | G06F 21/76 |
| 2022/0075873 A1* | 3/2022 | Gao | G06F 21/572 |
| 2022/0179960 A1* | 6/2022 | Spangler | G06F 21/572 |

OTHER PUBLICATIONS

Crawford, J.B.; "LinuxBoot: Linux as firmware"; Mar. 7, 2018; Eklektix, Inc.; accessed on the internet at URL<https://lwn.net/Articles/748586>. (Year: 2018).*

* cited by examiner

SYSTEM AND METHOD OF UTILIZING MULTIPLE INFORMATION HANDLING SYSTEM FIRMWARE ON AN INFORMATION HANDLING SYSTEM

BACKGROUND

Field of the Disclosure

This disclosure relates generally to information handling systems and more particularly to utilizing multiple information handling system firmware on an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may execute, by a processor of a baseboard management controller (BMC) of an information handling system, a BMC firmware bootloader; may read, by the BMC firmware bootloader, configuration information that indicates utilization of a custom information handling system firmware image by the information handling system; in response to reading the configuration information that indicates utilization of the custom information handling system firmware image, may provide, by the BMC firmware bootloader, the custom information handling system firmware image and a signature of the custom information handling system firmware image to a processor of the information handling system; may decrypt, by the processor of the information handling system, the signature of the custom information handling system firmware image to obtain a hash value of the custom information handling system firmware image; may determine, by the processor of the information handling system, a test hash value of the custom information handling system firmware image; may determine, by the processor of the information handling system, if the hash value matches the test hash value; if the hash value matches the test hash value, may boot, by the processor of the information handling system, a custom information handling system firmware from the custom information handling system firmware image; and if the hash value does not match the test hash value, may boot, by the processor of the information handling system, another information handling system firmware from another information handling system firmware image stored by a non-volatile memory medium of the information handling system.

In one or more embodiments, providing the custom information handling system firmware image and the signature of the custom information handling system firmware image to the processor of the information handling system may include providing a file system, which includes the custom information handling system firmware image and the signature of the custom information handling system firmware image, to the processor of the information handling system. In one example, providing the file system to the processor of the information handling system may include providing the file system to the processor of the information handling system via a universal serial bus (USB). In another example, the BMC may store the custom information handling system firmware image and the signature of the custom information handling system firmware image via a non-volatile memory medium of the BMC. In one or more embodiments, the BMC may receive the custom information handling system firmware image and the signature of the custom information handling system firmware image and may store the custom information handling system firmware image and the signature of the custom information handling system firmware image via the non-volatile memory medium of the BMC.

In one or more embodiments, providing the custom information handling system firmware image and the signature of the custom information handling system firmware image to the processor of the information handling system may include providing the custom information handling system firmware image and the signature of the custom information handling system firmware image to the processor of the information handling system via shared memory access. In one or more embodiments, the custom information handling system firmware includes a LinuxBoot information handling system firmware.

In one or more embodiments, the other information handling system firmware image may have been produced by a manufacturer of the information handling system. In one or more embodiments, the one or more systems, the one or more methods, and/or the one or more processes may further: configure, by the BMC bootloader, a complex logic device with information handling system firmware selection information that indicates utilization of the custom information handling system firmware image; and read, by the processor of the information handling system, the information handling system firmware selection information from the complex logic device. For example, configuring the complex logic device with the information handling system firmware selection information may include writing the information handling system firmware selection information to a memory address associated with the complex logic device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
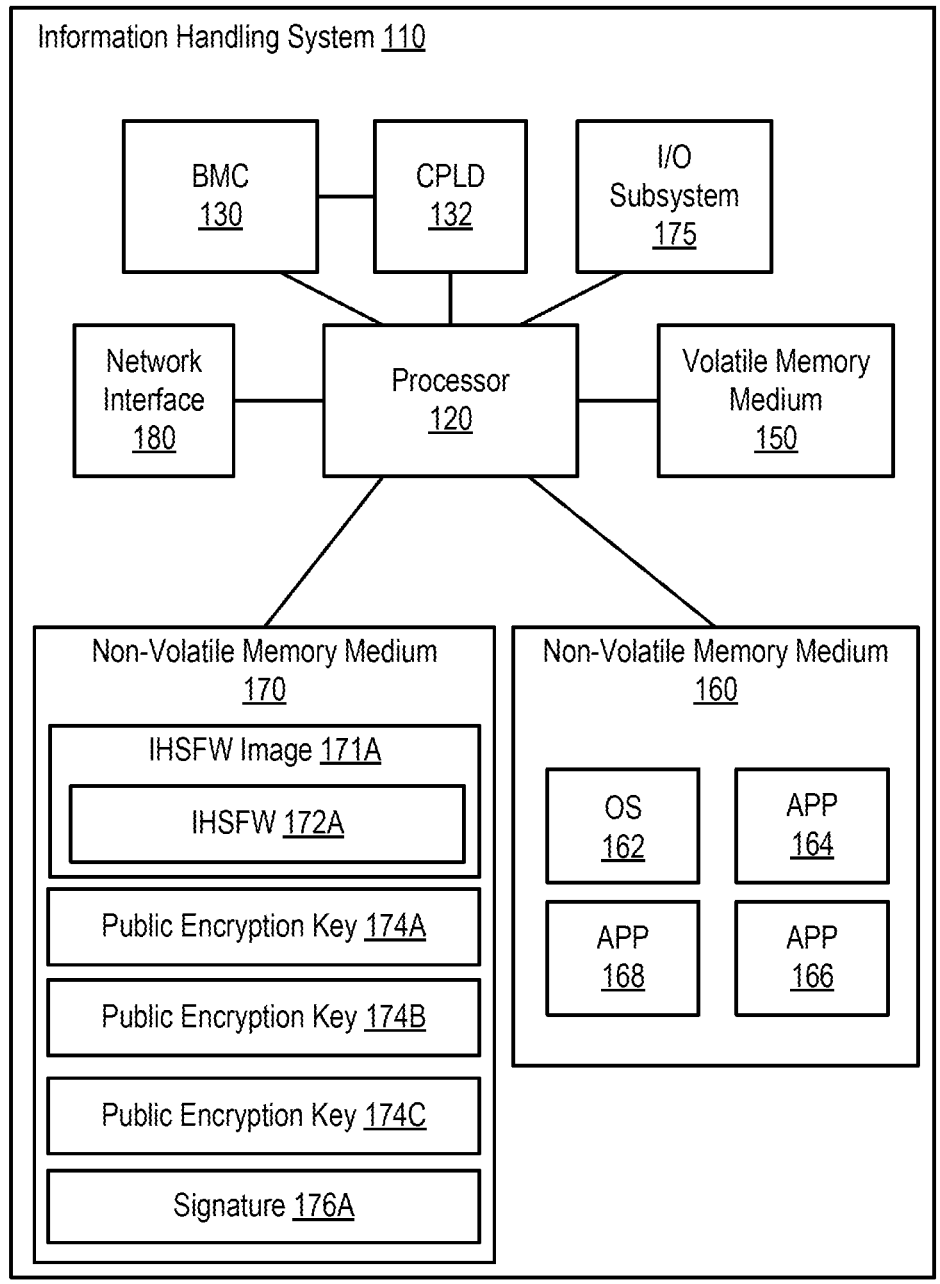
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a baseboard management controller (BMC) of an information handling system may utilize firmware from an original equipment manufacturer (OEM) of the information handling system. In one or more embodiments, the OEM may produce information handling system firmware for the information handling system. In one or more embodiments, the information handling system firmware may include processor instructions executable by a processor of the information handling system. For example, the information handling system firmware may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others.

In one or more embodiments, the BMC may utilize other firmware. For example, the BMC may utilize OpenBMC firmware. In one or more embodiments, the information handling system may utilize other information handling system firmware. For example, the information handling system may utilize LinuxBoot. For instance, LinuxBoot may include a firmware for information handling systems, which may replace specific firmware functionality such as a UEFI driver execution environment (DXE) phase with a LINUX® kernel.

In one or more embodiments, an information handling system may include multiple BMC firmware stacks. For example, an administrator (e.g., a user) may choose which one of the multiple BMC firmware stacks is to be utilized by a BMC of the information handling system. In one instance, the administrator may choose that the BMC executes BMC firmware from an OEM of the information handling system. In a second instance, the administrator may choose that the BMC executes OpenBMC firmware. In another instance, the administrator may choose that the BMC executes custom BMC firmware. As an example, the custom BMC firmware may be or may include do it yourself (DIY) BMC firmware. In one instance, the DIY BMC firmware may permit full freedom in operating the BMC. In another instance, the DIY BMC firmware may be based at least on the OpenBMC firmware. As an example, the DIY BMC firmware may be a modification of the OpenBMC firmware.

In one or more embodiments, multiple bootloaders may be supported on an information handling system. In one or more embodiments, a bootloader image may be served by a BMC firmware stack. For example, multiple bootloader images may be stored within a BMC environment and may be exposed, on demand, to a processor of an information handling system. For instance, a bootloader image of the multiple bootloader images may be provided the processor during boot up. As an example, the bootloader image may be provided the processor via a partition such that the processor can read instructions and/or data stored by the bootloader image. For instance, the partition may include a shared memory access (SMA) partition, a mass storage device partition, which is exposed as a universal serial bus (USB) device, or a virtual file system (VFS) partition, among others.

In one or more embodiments, a personality module (PM) may be installed on an information handling system. For example, the PM may enable the information handling system to execute OpenBMC firmware. For instance, the PM may "unlock" the information handling system to execute OpenBMC firmware. As an example, the information handling system may include one or more security features that may prevent a firmware stack that was not produced or signed by an OEM of the information handling system to be executed by a BMC of the information handling system.

In one or more embodiments, the PM may deliver branding logos and/or metadata such as unlocking grants to the information handling system firmware of the information handling system as part of its payload. For example, the PM may be equipped to install a customer information handling system firmware verification public encryption key. In one or more embodiments, the public encryption key may be utilized in verifying and/or authenticating one or more information handling system firmware images. For example, each of the one or more information handling system firmware images may be signed with a private encryption key associated with a respective public encryption key. In one or more embodiments, an administrator may deploy the one or more information handling system firmware images to the information handling system. For example, the administrator may sign each of the one or more information handling system firmware images utilizing a private encryption key. For instance, the one or more information handling system firmware images may include a LinuxBoot image, and the LinuxBoot image may be signed utilizing a private encryption key.

In one or more embodiments, a circle of trust may be utilized in booting the information handling system. For example, a bootloader of the BMC may be or may include a first part of the circle of trust. For instance, the bootloader of the BMC may be or may include U-Boot. In one or more embodiments, when the information handling system is powered on, the BMC may execute the bootloader of the BMC. For example, the bootloader of the BMC may read information handling system firmware configuration information, which may indicate a selection of information handling system firmware. For instance, the information handling system firmware configuration information may be stored via configuration settings of the BMC (e.g., a persistent file). In one or more embodiments, the BMC may configure a complex logic device (CPLD) based at least on information from the configuration settings of the BMC. For example, configuring the CPLD may be or may include setting bits in a CPLD mailbox. For instance, configuring the CPLD may be or may include a second part of the circle of trust in booting the information handling system.

In one or more embodiments, the CPLD may be or may include a programmable logic device with complexity between that of a programmable array logic (PAL) and a field programmable gate array (FPGA), which may include architectural features of both. For example, the CPLD may include a macrocell, which may include logic implementing disjunctive normal form expressions and more specialized logic operations. In one or more embodiments, information handling system firmware of the information handling system may read information from the CPLD mailbox. For example, the information handling system may change a "personality" of the information handling system and/or may change a boot path based at least on the information from the CPLD mailbox.

In one or more embodiments, an information handling system firmware image may reside in a non-volatile memory medium of the information handling system. For example, the information handling system firmware image may be stored via a serial peripheral interconnect (SPI) storage device. For instance, the SPI storage device may include flash memory. In one or more embodiments, information handling system firmware data may reside in the non-volatile memory medium of the information handling system. For example, the information handling system firmware data may be stored via the SPI storage device.

In one or more embodiments, the information handling system firmware may implement a boot guard or a hardware root of trust associated with the information handling system. For example, the boot guard or the hardware root of trust associated with the information handling system may validate an initial boot block (IBB) and/or one or more pre-EFI initialization (PEI) modules. For instance, the one or more PEI modules may initialize a memory subsystem of the information handling system. In one or more embodiments, the one or more PEI modules may determine if an administrator has configured the information handling system to boot LinuxBoot. For example, determining if the administrator has configured the information handling system to boot LinuxBoot may be based at least on the information from CPLD mailbox. If the administrator has configured the information handling system to boot LinuxBoot, LinuxBoot may be executed. If the administrator has not configured the information handling system to boot LinuxBoot, information handling system firmware from the OEM may be executed. In one or more embodiments, when the information handling system firmware from the OEM is executed, the one or more PEI modules may further validate one or more DXE modules and one or more boot device select (BDS) modules before passing control to the one or more DXE modules and the one or more BDS modules.

In one or more embodiments, when LinuxBoot is executed, the one or more PEI modules may initiate a request to the BMC to share the LinuxBoot image with the processor of the information handling system. For example, the one or more PEI modules may initiate the request to the BMC via an intelligent platform management interface (IPMI), among others. In one or more embodiments, the one or more PEI modules may validate and/or authenticate the shared LinuxBoot image with a public encryption key before passing control to the LinuxBoot image. In one or more embodiments, before passing control to the LinuxBoot image, the SPI storage device and/or other data storage areas may be put into a power supply lockdown mode to protect from tampering from LinuxBoot. For example, this may ensure an integrity of the OEM information handling system firmware contents is maintained, even when it is not being utilized. If the LinuxBoot image is not validated and/or authenticated, control may not be passed to the LinuxBoot image. For example, the processor of the information handling system may continue to execute the information handling system firmware from the OEM of the information handling system, if the LinuxBoot image is not validated and/or authenticated.

In one or more embodiments, the bootloader of the BMC may be extended to perform a minimal information handling system firmware root of trust verification on the information handling system firmware image primary stages (e.g., SEC (security), PSP (platform security processor), IBB, PEI, etc.) on every information handling system boot before releasing the processor of the information handling system from reset. For example, this may ensure that the information handling system always starts with a trusted information handling system firmware image before passing a chain of trust to a LinuxBoot image.

In one or more embodiments, the information handling system boot selection may be changed by BMC firmware. For example, the selection may be stored in a persistent configuration area. In one instance, the BMC may include the persistent configuration area. In another instance, the persistent configuration area may be external to the BMC. In one or more embodiments, the selection may be read by the bootloader of the BMC when the information handling system powers on. For example, the selection may be relayed to the information handling system firmware via a CPLD mailbox. In one or more embodiments, updating a LinuxBoot file may include storing a new LinuxBoot file on the BMC. For example, updating a LinuxBoot file may include replacing the LinuxBoot file with a new LinuxBoot file on the BMC.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a BMC 130, a CPLD 132, a volatile memory medium 150, non-volatile memory media 160 and 170, an I/O subsystem 175, and a network interface 180. As illustrated, BMC 130, CPLD 132, volatile memory medium 150, non-volatile memory media 160 and 170, I/O subsystem 175, and network interface 180 may be communicatively coupled to processor 120.

In one or more embodiments, one or more of BMC 130, CPLD 132, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, CPLD 132, volatile memory medium 150, non-volatile memory media 160 and 170, I/O subsystem 175, and network interface 180 may be communicatively coupled to processor 120 via one or more PCI-Express (PCIe) root complexes. In another example, one or more of I/O BMC 130, CPLD 132, subsystem 175, and network interface 180 may be communicatively coupled to processor 120 via one or more PCIe switches. In one or more embodiments, BMC 130 may be communicatively coupled to CPLD 132. In one example, BMC 130 may be communicatively coupled to CPLD 132 via one or more buses. In another example, BMC 130 may be communicatively coupled to CPLD 132 via general purpose I/O (GPIO).

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) image 171A. As shown, IHSFW image 171A may include IHSFW image 172A. In one or more embodiments, IHSFW 172 may include processor instructions executable by processor 120. For example, IHSFW 172 may include one or more structures and/or one or more functionalities of and/or compliant with one or more of a BIOS, an EFI, a UEFI, and an ACPI, among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. As illustrated, non-volatile memory medium 170 may include public encryption keys 174A-174C. In one or more embodiments, public encryption keys 174A-174C may be utilized in authenticating IHSFW images 171A-171C, respectively. As shown, non-volatile memory medium 170 may include a signature 176A. In one or more embodiments, signature 176A may be a signature associated with IHSFW image 171A.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an IPMI standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, BMC 130 may be or include an ARM Cortex-A processor. In another example, BMC 130 may be or include an Intel Atom processor. In one or more embodiments, BMC 130 may be or include one or more of a FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

Figure 2:
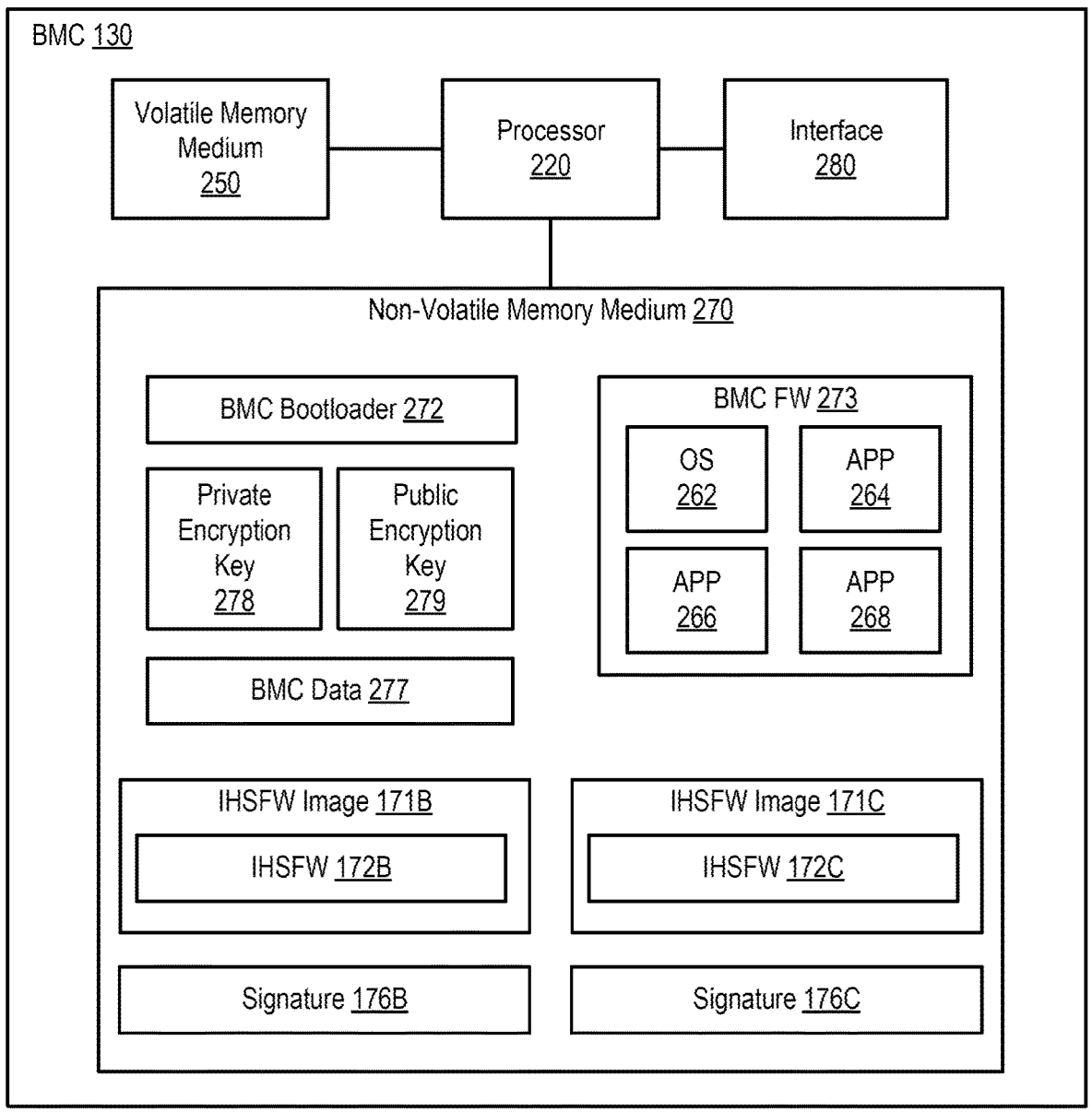
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC bootloader 272, a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 may be different from public encryption key 279. For example, private encryption key 278 and public encryption key 279 may be asymmetric encryption keys. In one instance, data encrypted via private encryption key 278 may be decrypted via public encryption key 279. In another instance, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include GPIO circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

In one or more embodiments, non-volatile memory medium 270 may store IHSFW images 171B and 171C. For example, IHSFW images 171B and 171C may include IHSFW 172B and IHSFW 172C, respectively. In one or more embodiments, non-volatile memory medium 270 may store signatures 176B and 176C. For example, signatures 176B and 176C may be signatures associated with IHSFW images 171B and 171C, respectively.

Figure 3:
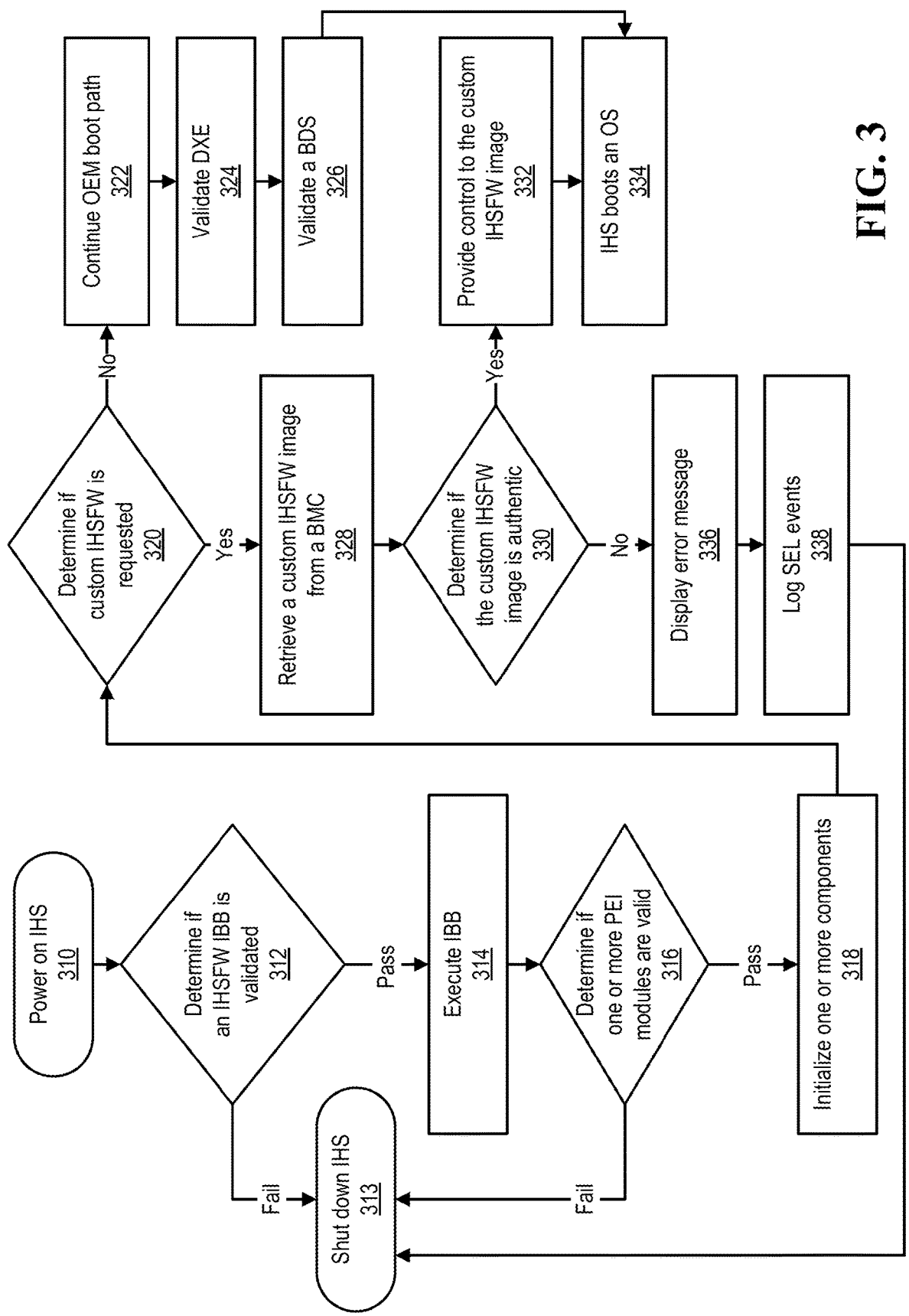
FIG. 3 illustrates an example of a method of operating an information handling system, according to one or more embodiments.

Turning now to FIG. 3, an example of a method of operating an information handling system is illustrated, according to one or more embodiments. At 310, an information handling system may be powered on. For example, IHS 110 may be powered on. At 312, it may be determined if an IHSFW IBB is validated. In one example, a boot guard (BtG) may determine if an IHSFW IBB is validated. In another example, a platform secure boot (PSB) may determine if an IHSFW IBB is validated. If the IHSFW IBB is not validated, the information handling system may be shut down, at 313. For example, IHS 110 may be shut down. If the IHSFW IBB is validated, the IHSFW IBB may be executed. For example, processor 120 may execute the IHSFW IBB.

At 316, it may be determined if one or more PEI modules are valid. For example, the IHSFW IBB may determine if one or more PEI modules are valid. If the one or more PEI modules are not valid, the method may proceed to 313, according to one or more embodiments. If the one or more PEI modules are valid, one or more components of the information handling system may be initialized. In one example, the one or more components may include volatile memory medium 150, which may be initialized if the one or more PEI modules are valid. For instance, the one or more PEI modules may initialize volatile memory medium 150. In another example, the one or more components may include a chipset of the information handling system. For instance, the one or more PEI modules may initialize a chipset of IHS 110.

At 320, it may be determined if custom IHSFW is requested. For example, the custom IHSFW may include LinuxBoot. For instance, it may be determined if LinuxBoot is requested. In one or more embodiments, the custom IHSFW may include a custom information handling system bootloader. For example, the custom information handling system bootloader may be different from an OS bootloader. For instance, an OS bootloader may be or may include GNU GRUB.

In one or more embodiments, determining if the custom IHSFW is requested may include receiving information from a CPLD. For example, determining if the custom IHSFW is requested may include receiving one or more bits from CPLD 132. In one instance, the one or more bits from CPLD 132 may indicate that the custom IHSFW is requested. In another instance, the one or more bits from CPLD 132 may indicate that the custom IHSFW is not requested. In one or more embodiments, a mailbox of CPLD 132 may store the one or more bits that indicate if the custom IHSFW is requested.

If the custom IHSFW is not requested, an OEM boot path may be continued, at 322. For example, a UEFI boot path associated with IHSFW 172A may be continued. At 324, a DXE may be validated. For example, the one or more PEI modules may validate a DXE. At 326, a BDS may be validated. For example, the DXE may validate a BDS. In one or more embodiments, the method may proceed to 334, where an OS may be booted. For example, OS 162 may be booted. For instance, OS 162 may include LINUX®, FREE-BSD®, NETBSD®, OpenBSD, Minix, Xinu, Darwin, or MICROSOFT® Windows, among others.

If the custom IHSFW is requested, a custom IHSFW image may be retrieved from a BMC, at 328. For example, IHSFW image 171B may be retrieved from BMC 130. At 330, it may be determined if the custom IHSFW image is authentic. In one or more embodiments, determining if the custom IHSFW image is authentic may include decrypting a signature associated with the custom IHSFW image to obtain a hash value of the custom IHSFW image. In one or more embodiments, a test hash value of custom IHSFW image may be determined. In one example, if the test hash value matches the hash value determined by decrypting the signature, then the custom IHSFW image may be determined as authentic. In another example, if the test hash value does not match the hash value determined by decrypting the signature, then the custom IHSFW image may be determined as not authentic.

In one or more embodiments, a hash value of data may be determined via a one-way hash function. In one example, a one-way hash function may be relatively easy to compute. For instance, for data x (e.g., a number, a string, binary data, etc.) and a one-way hash function h, h(x) may be relatively easy to compute. In another example, a one-way hash function may significantly difficult to reverse. For instance, for the one-way hash function h and a hash value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, SHA-512, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or may be said to be strengthened.

As an example, a signature 176 may be decrypted, utilizing a public encryption key 174, to obtain a hash value of an IHSFW image 171. For instance, a test hash value of IHSFW image 171 may be determined, and if the test hash value of IHSFW image 171 and the hash value of IHSFW image 171 match, then IHSFW image 171 may be determined as authentic and/or authenticated. In one or more embodiments, the hash value of IHSFW image 171 have been encrypted with a private encryption key associated with public encryption key 174 to produce signature 176. For example, public encryption key 174 and the private encryption key associated with public encryption key 174 may be encryption keys of an asymmetric encryption process.

If the custom IHSFW image is authentic, control may be provided to the custom IHSFW image, at 332. For example, the one or more PEI module may provide control to the custom IHSFW image. For instance, processor 120 may begin executing IHSFW 172B of IHSFW image 171B. At 334, an OS may be booted. For example, OS 162 may be booted. For instance, OS 162 may include LINUX®, FREE-BSD®, NETBSD®, OpenBSD, Minix, Xinu, Darwin, or MICROSOFT® Windows, among others.

If the custom IHSFW image is not authentic, an error message may be displayed. In one example, an error message may be displayed via a display associated with IHS 110. In one instance, IHS 110 may include the display. In another instance, the display may be external to IHS 110 and communicatively coupled to IHS 110. In another example, an error message may be displayed via a remote information handling system. At 338, system event log (SEL) errors may be logged. In one or more embodiments, the method may proceed to 313, according to one or more embodiments.

Figure 4:
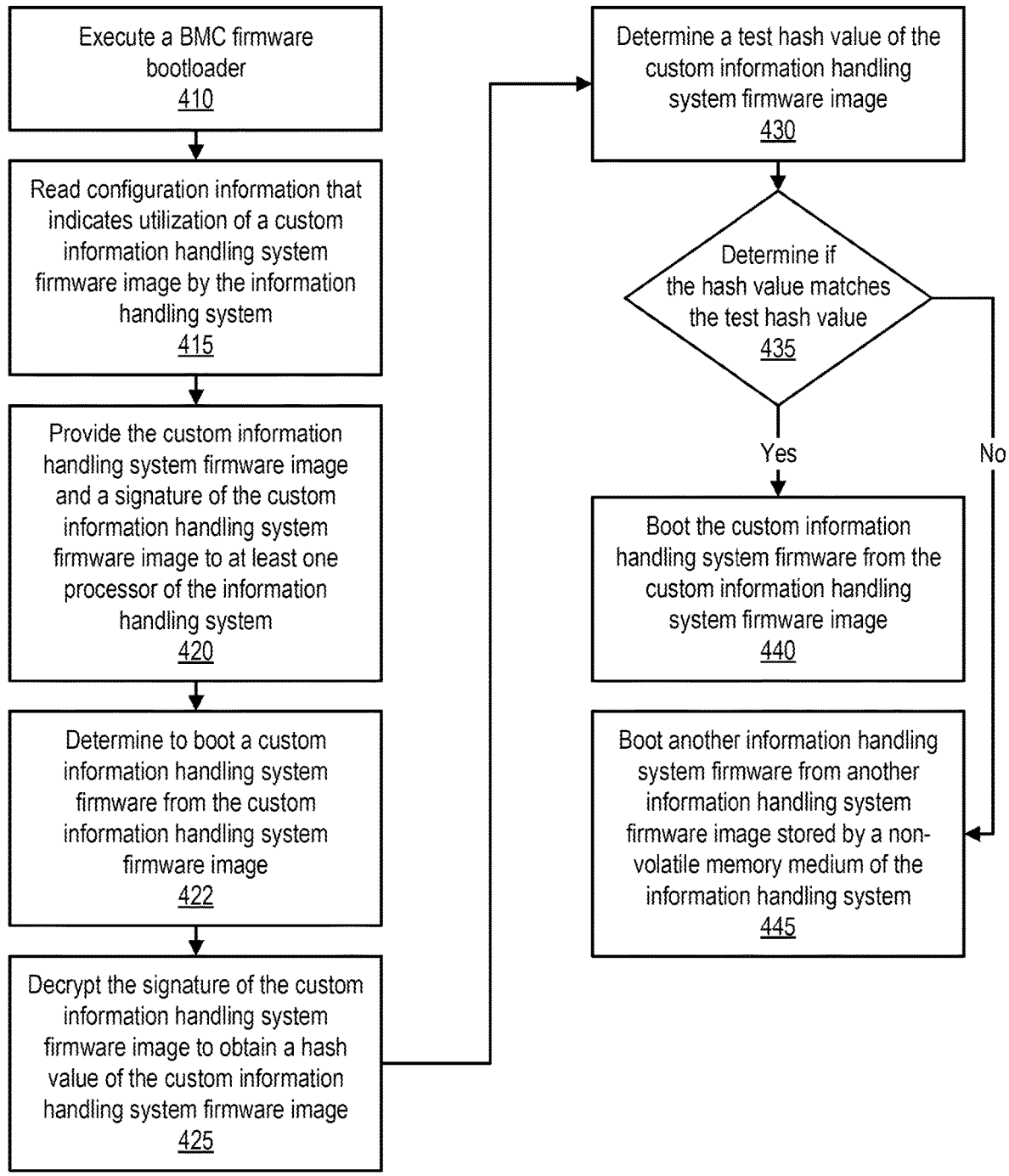
FIG. 4 illustrates another example of a method of operating an information handling system, according to one or more embodiments.

Turning now to FIG. 4, another example of a method of operating an information handling system is illustrated, according to one or more embodiments. At 410, a BMC firmware bootloader may be executed. For example, BMC 130 may execute BMC bootloader 272. For instance, processor 220 of BMC 130 may execute BMC bootloader 272. In one or more embodiments, BMC 130 may execute BMC bootloader 272 when power is applied to BMC 130 or when BMC 130 is reset. In one example, power may be applied to BMC 130 when IHS 110 is powered on. In another example, BMC 130 may be reset when IHS 110 is reset.

At 415, configuration information that indicates utilization of a custom information handling system firmware image by the information handling system may be read. For example, BMC 130 may read configuration information that indicates utilization of a custom information handling system firmware image (e.g., IHSFW image 171B) by IHS 110. For instance, BMC bootloader 272 may read the configuration information that indicates utilization of the custom information handling system firmware image by IHS 110. In one or more embodiments, BMC 130 may store the configuration information that indicates utilization of the custom information handling system firmware image by IHS 110. For example, non-volatile memory medium 270 may store the configuration information that indicates utilization of the custom information handling system firmware image by IHS 110. For instance, BMC data 277 may store the configuration information that indicates utilization of the custom information handling system firmware image by IHS 110.

At 420, the custom information handling system firmware image and a signature of the custom information handling system firmware image may be provided to at least one processor of the information handling system. For example, BMC 130 may provide the custom information handling system firmware image (e.g., IHSFW image 171B) and a signature of the custom information handling system firmware image (e.g., signature 176B) to processor 120 of IHS 110.

In one or more embodiments, providing the custom information handling system firmware image and the signature of the custom information handling system firmware image to the at least one processor of the information handling system may be performed in response to reading the configuration information that indicates utilization of the custom information handling system firmware image. For example, providing the custom information handling system firmware image and the signature of the custom information handling system firmware image to the at least one processor of the information handling system may be performed in response to the configuration information that indicates utilization of the custom information handling system firmware image. In one or more embodiments, providing the custom information handling system firmware image and the signature of the custom information handling system firmware image to the at least one processor of the information handling system may include providing a file system, which includes the custom information handling system firmware image and the signature of the custom information handling system firmware image, to the at least one processor of the information handling system. In one example, providing the file system to the at least one processor of the information handling system may include providing the file system to the at least one processor of the information handling system via a USB. For instance, BMC 130 may provide the file system to processor 120 of IHS 110 via a USB. In one or more embodiments, the BMC may store the custom information handling system firmware image and the signature of the custom information handling system firmware image via a non-volatile memory medium of the BMC. For example, BMC 130 may store the custom information handling system firmware image (e.g., IHSFW image 171B) and the signature of the custom information handling system firmware image (e.g., signature 176B) via non-volatile memory medium 270 of BMC 130.

In one or more embodiments, providing the custom information handling system firmware image and the signature of the custom information handling system firmware image to the at least one processor of the information handling system may include providing the custom information handling system firmware image and the signature of the custom information handling system firmware image to the at least one processor of the information handling system via shared memory access. For example, BMC 130 may provide the custom information handling system firmware image and the signature of the custom information handling system firmware image to processor 120 of IHS 110 via shared memory access.

At 422, it may be determined to boot a custom information handling system firmware from the custom information handling system firmware image. For example, processor 120 may determine to boot a custom information handling system firmware (e.g., IHSFW 172B) from the custom information handling system firmware image (e.g., IHSFW image 171B). In one example, BMC 130 may configure a complex logic device (e.g., CPLD 132) with information handling system firmware selection information that indicates utilization of the custom information handling system firmware image. For instance, BMC bootloader 272 may configure a complex logic device (e.g., CPLD 132) with information handling system firmware selection information that indicates utilization of the custom information handling system firmware image. In another example, processor 120 may read the information handling system firmware selection information from the complex logic device (e.g., CPLD 132). For instance, processor 120 may read a CPLD mailbox to obtain the information handling system firmware selection information from the complex logic device. In one or more embodiments, processor 120 may determine to boot the custom information handling system firmware from the custom information handling system firmware image based at least on the information handling system firmware selection information. For example, processor 120 may determine to boot the custom information handling system firmware from the custom information handling system firmware image based at least on the information handling system firmware selection information from the complex logic device.

At 425, the signature of the custom information handling system firmware image may be decrypted to obtain a hash value of the custom information handling system firmware image. For example, processor 120 of IHS 110 may decrypt the signature of the custom information handling system firmware image to obtain a hash value of the custom information handling system firmware image. For instance, processor 120 of IHS 110 may utilize public encryption key 174B to decrypt the signature of the custom information handling system firmware image (e.g., signature 176B) to obtain a hash value of the custom information handling system firmware image (e.g., IHSFW image 171B). As an example, processor 120 of IHS 110 may utilize an asymmetric encryption process, utilizing public encryption key 174B, to decrypt the signature of the custom information handling system firmware image (e.g., signature 176B) to obtain a hash value of the custom information handling system firmware image (e.g., IHSFW image 171B). In one or more embodiments, signature 176B may have been produced by encrypting the hash value of IHSFW image 171B with a private encryption key associated with public encryption key 174B. In one or more embodiments, processor 120 may retrieve public encryption key 174B from non-volatile memory medium 170.

At 430, a test hash value of the custom information handling system firmware image may be determined. For example, processor 120 may determine a test hash value of the custom information handling system firmware image. At 435, it may be determined if the hash value matches the test hash value. For example, processor 120 may determine if the hash value matches the test hash value. If the hash value matches the test hash value, the custom information handling system firmware from the custom information handling system firmware image may be booted, at 440. For example, processor 120 may boot a custom information handling system firmware (e.g., IHSFW 172B) from the custom information handling system firmware image (e.g., IHSFW 171B). In one or more embodiments, the custom information handling system firmware (e.g., IHSFW 172B) may include a firmware for IHS 110, which may replace specific firmware functionality such as a UEFI DXE phase with a kernel of an operating system. For example, the custom information handling system firmware (e.g., IHSFW 172B) may include a LinuxBoot information handling system firmware.

In one or more embodiments, if the hash value matches the test hash value, before booting the custom information handling system firmware, non-volatile memory medium 170 may be protected from writing information to non-volatile memory medium 170. For example, protecting non-volatile memory medium 170 from writing information to non-volatile memory medium 170 may protect one or more of IHSFW image 171A and IHSFW 172A, among others, from possible or inadvertent tampering from the custom information handling system firmware. For instance, this may ensure an integrity of the one or more of IHSFW image 171A and IHSFW 172A (e.g., OEM information handling system firmware contents) is maintained, even when it is not being utilized.

If the hash value does not match the test hash value, another information handling system firmware from another information handling system firmware image stored by a non-volatile memory medium of the information handling system may be booted, at 445. For example, processor 120 may boot another information handling system firmware (e.g., IHSFW 172A) from another information handling system firmware image (e.g., IHSFW images 171A) stored by a non-volatile memory medium (e.g., non-volatile memory medium 170) of IHS 110. For instance, processor 120 may boot the other information handling system firmware (e.g., IHSFW 172A) from the other information handling system firmware image (e.g., IHSFW images 171A) stored by the non-volatile memory medium (e.g., non-volatile memory medium 170) of IHS 110, which is not included by BMC 130.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a baseboard management controller (BMC) coupled to the at least one processor; and
   a complex logic device coupled to the at least one processor and coupled to the BMC;
   wherein the BMC is configured to:
      execute a BMC firmware bootloader;
      read, by the BMC firmware bootloader, configuration information that indicates utilization of a custom information handling system firmware image by the information handling system;
      in response to reading the configuration information that indicates utilization of the custom information handling system firmware image, provide, to the at least one processor via a universal serial bus (USB), a file system, which includes the custom information handling system firmware image and a signature of the custom information handling system firmware image; and
      configure, by the BMC firmware bootloader, the complex logic device with information handling system firmware selection information that indicates utilization of the custom information handling system firmware image; and
   wherein the at least one processor is configured to:
      read the information handling system firmware selection information from the complex logic device;
      decrypt the signature of the custom information handling system firmware image to obtain a hash value of the custom information handling system firmware image;
      determine a test hash value of the custom information handling system firmware image;
      determine if the hash value matches the test hash value;
      if the hash value matches the test hash value, boot a custom information handling system firmware from the custom information handling system firmware image; and
      if the hash value does not match the test hash value, boot another information handling system firmware from another information handling system firmware image stored by a non-volatile memory medium of the information handling system.

2. The information handling system of claim 1, wherein the BMC stores the custom information handling system firmware image and the signature of the custom information handling system firmware image via a non-volatile memory medium of the BMC.

3. The information handling system of claim 1, wherein, to provide the custom information handling system firmware image and the signature of the custom information handling system firmware image to the at least one processor, the BMC is further configured to provide, by the BMC firmware bootloader, the custom information handling system firmware image and the signature of the custom information handling system firmware image to the at least one processor via shared memory access.

4. The information handling system of claim 1, wherein the custom information handling system firmware includes a LinuxBoot information handling system firmware.

5. The information handling system of claim 1, wherein the BMC is further configured to:
receive the custom information handling system firmware image and the signature of the custom information handling system firmware image; and
store the custom information handling system firmware image and the signature of the custom information handling system firmware image via a non-volatile memory medium of the BMC.

6. The information handling system of claim 1, wherein the other information handling system firmware image was produced by a manufacturer of the information handling system.

7. The information handling system of claim 1, wherein, to configure the complex logic device with the information handling system firmware selection information, the BMC is further configured to write, by the BMC bootloader, the information handling system firmware selection information to a memory address associated with the complex logic device.

8. A method, comprising:
executing, by a processor of a baseboard management controller (BMC) of an information handling system, a BMC firmware bootloader;
reading, by the BMC firmware bootloader, configuration information that indicates utilization of a custom information handling system firmware image by the information handling system;
in response to the reading the configuration information that indicates utilization of the custom information handling system firmware image, providing, by the BMC via a universal serial bus (USB), a file system, which includes the custom information handling system firmware image and a signature of the custom information handling system firmware image, to a processor of the information handling system;
configuring, by the BMC firmware bootloader, a complex logic device with information handling system firmware selection information that indicates utilization of the custom information handling system firmware image;
reading, by the processor of the information handling system, the information handling system firmware selection information from the complex logic device;
decrypting, by the processor of the information handling system, the signature of the custom information handling system firmware image to obtain a hash value of the custom information handling system firmware image;
determining, by the processor of the information handling system, a test hash value of the custom information handling system firmware image;
determining, by the processor of the information handling system, if the hash value matches the test hash value;
if the hash value matches the test hash value, booting, by the processor of the information handling system, a custom information handling system firmware from the custom information handling system firmware image; and
if the hash value does not match the test hash value, booting, by the processor of the information handling system, another information handling system firmware from another information handling system firmware image stored by a non-volatile memory medium of the information handling system.

9. The method of claim 8, wherein the BMC stores the custom information handling system firmware image and the signature of the custom information handling system firmware image via a non-volatile memory medium of the BMC.

10. The method of claim 8, wherein the providing the custom information handling system firmware image and the signature of the custom information handling system firmware image to the processor of the information handling system includes providing the custom information handling system firmware image and the signature of the custom information handling system firmware image to the processor of the information handling system via shared memory access.

11. The method of claim 8, wherein the custom information handling system firmware includes a LinuxBoot information handling system firmware.

12. The method of claim 8, further comprising:
receiving, by the BMC, the custom information handling system firmware image and the signature of the custom information handling system firmware image; and
storing, by the BMC, the custom information handling system firmware image and the signature of the custom information handling system firmware image via a non-volatile memory medium of the BMC.

13. The method of claim 8, wherein the other information handling system firmware image was produced by a manufacturer of the information handling system.

14. The method of claim 8, wherein the configuring the complex logic device with the information handling system firmware selection information includes writing the information handling system firmware selection information to a memory address associated with the complex logic device.

* * * * *